United States Patent
Vandermolen (10) Patent No.: US 7,334,411 B2
(45) Date of Patent: Feb. 26, 2008

(54) GAS TURBINE HEAT EXCHANGER ASSEMBLY AND METHOD FOR FABRICATING SAME

(75) Inventor: Robert Vandermolen, Peabody, MA (US)

(73) Assignee: General Electric Company, Schenectady, NY (US)

( * ) Notice: Subject to any disclaimer, the term of this patent is extended or adjusted under 35 U.S.C. 154(b) by 561 days.

(21) Appl. No.: 10/902,445

(22) Filed: Jul. 29, 2004

(65) Prior Publication Data

US 2005/0235627 A1 Oct. 27, 2005

Related U.S. Application Data

(63) Continuation-in-part of application No. 10/828,663, filed on Apr. 21, 2004, now Pat. No. 7,254,937.

(51) Int. Cl.
*F02C 7/10* (2006.01)

(52) U.S. Cl. ............... 60/772; 60/266; 60/39.511

(58) Field of Classification Search ............ 60/226.1, 60/266, 267, 39.511, 772
See application file for complete search history.

(56) References Cited

U.S. PATENT DOCUMENTS

| | | | | |
|---|---|---|---|---|
| 3,201,938 A | * | 8/1965 | Zirin | 60/39.511 |
| 3,222,864 A | * | 12/1965 | Dyste et al. | 60/39.511 |
| 3,267,673 A | * | 8/1966 | Hemsworth et al. | 60/39.511 |
| 4,050,242 A | | 9/1977 | Dusa | |
| 5,220,785 A | * | 6/1993 | Miller | 60/39.093 |
| 5,396,760 A | | 3/1995 | Hines | |
| 6,050,082 A | | 4/2000 | Leonard et al. | |
| 2002/0020168 A1 | | 2/2002 | Boeck | |

FOREIGN PATENT DOCUMENTS

GB 659151 10/1951
GB 1084889 9/1967

OTHER PUBLICATIONS

International Search Report; Place of Search MUNICH; dated Dec. 6, 2005; Reference 154601/10821; Application No. 05254457;4-2315, 8 Pgs.

* cited by examiner

*Primary Examiner*—Ted Kim
(74) *Attorney, Agent, or Firm*—William Scott Andes; Armstrong Teasdale LLP (57) ABSTRACT

A method for assembling a gas turbine engine includes fabricating a heat exchanger that includes a first manifold including an inlet and an outlet, a first quantity of heat exchanger elements coupled in flow communication with the manifold inlet, a second quantity of heat exchanger elements coupled in flow communication with the manifold outlet, and a plurality of channels coupled in flow communication with the first and second quantity of heat exchanger elements to facilitate channeling compressor discharge air from the first quantity of heat exchanger elements to the second quantity of heat exchanger elements, and coupling the heat exchanger assembly to the gas turbine engine such that the heat exchanger is positioned substantially concentrically with respect to a gas turbine engine axis of rotation, and such that the heat exchanger is configured to receive compressor discharge air and channel the compressor discharge air to the combustor.

20 Claims, 7 Drawing Sheets

GAS TURBINE HEAT EXCHANGER ASSEMBLY AND METHOD FOR FABRICATING SAME

CROSS REFERENCE TO RELATED APPLICATIONS

This application is a Continuation In Part of U.S. patent application Ser. No. 10/828,663 filed Apr. 21, 2004 now U.S. Pat. No. 7,254,937.

BACKGROUND OF THE INVENTION

This invention relates generally to gas turbine engines, and more particularly to heat exchangers used with gas turbine engines.

At least one known gas turbine engine uses a heat exchanger, generally referred to as a recuperator, to facilitate reducing specific fuel consumption. More specifically, pressurized air from the compressor section of the gas turbine engine is channeled from the gas turbine engine, and through the heat exchanger, such that the hot exhaust gases of the engine raise the operating temperature of the pressurized air prior to it being supplied into the combustor.

Known heat exchanger assemblies are positioned between the gas turbine engine exhaust gas box and the exhaust stack. At least some known heat exchanger assemblies include a pair of heat exchangers coupled in a parallel spaced relationship such that a space known as a bypass duct is defined therebetween. The bypass duct is closable by a butterfly valve. However, since known heat exchangers are typically physically large and rectangular-shaped, such heat exchangers are mounted externally to the gas turbine engine. Accordingly, the compressor discharge air and the engine exhaust gas is routed to and from the heat exchangers through a ducting which couples the heat exchangers to the gas turbine engine. As a result, known heat exchanger assemblies occupy a relatively large volume which is often larger than a volume occupied by the gas turbine engine itself. The resulting large and irregular heat exchanger assembly, coupled with the added weight and cost of the heat exchanger and ducting, generally makes regenerative engine systems unfeasible for aircraft applications.

In addition, although recuperated engines generally achieve a better low power specific fuel consumption than other known gas turbine engines, when such engines are operated with a heat exchanger assembly and at a higher operating power, gas-side total pressure losses of the hot exhaust gas stream may be relatively high through the exhaust system heat exchanger. The increased gas-side pressure losses caused by the heat exchanger assembly may result in an increased specific fuel consumption. Moreover, since the size of the heat exchanger is generally desired to be as small as possible, less space is available for a bypass system, which may result in high exhaust total pressure losses during high-power engine operating conditions.

BRIEF DESCRIPTION OF THE INVENTION

In one aspect, a method for assembling a gas turbine engine is provided. The method includes fabricating a heat exchanger that includes a first manifold including an inlet and an outlet, a first quantity of heat exchanger elements coupled in flow communication with the manifold inlet, a second quantity of heat exchanger elements coupled in flow communication with the manifold outlet, and a plurality of channels coupled in flow communication with the first and second quantity of heat exchanger elements to facilitate channeling compressor discharge air from the first quantity of heat exchanger elements to the second quantity of heat exchanger elements, and coupling the heat exchanger assembly to the gas turbine engine such that the heat exchanger is positioned substantially concentrically with respect to a gas turbine engine axis of rotation, and such that the heat exchanger is configured to receive compressor discharge air and channel the compressor discharge air to the combustor.

In another aspect, a heat exchanger assembly for a gas turbine engine is provided. The heat exchanger assembly includes an annular heat exchanger coupled in flow communication to a compressor. The heat exchanger includes a first manifold comprising an inlet and an outlet, wherein the manifold inlet comprises a cross-sectional area that is inversely proportional to a cross-sectional area of the manifold outlet, a first quantity of heat exchanger elements coupled in flow communication with the manifold inlet, a second quantity of heat exchanger elements coupled in flow communication with the manifold outlet, and a plurality of channels coupled in flow communication with the first and second quantity of heat exchanger elements to facilitate channeling compressor discharge air from the first quantity of heat exchanger elements to the second quantity of heat exchanger elements.

In a further aspect, a gas turbine engine is provided. The gas turbine engine includes a compressor, a combustor downstream from the compressor, a turbine coupled in flow communication with the combustor, and a heat exchanger assembly. The heat exchanger assembly includes an annular heat exchanger coupled in flow communication to a compressor. The heat exchanger includes a first manifold comprising an inlet and an outlet, wherein the manifold inlet comprises a cross-sectional area that is inversely proportional to a cross-sectional area of the manifold outlet, a first quantity of heat exchanger elements coupled in flow communication with the manifold inlet, a second quantity of heat exchanger elements coupled in flow communication with the manifold outlet, and a plurality of channels coupled in flow communication with the first and second quantity of heat exchanger elements to facilitate channeling compressor discharge air from the first quantity of heat exchanger elements to the second quantity of heat exchanger elements.

DETAILED DESCRIPTION OF THE INVENTION

Figure 1:
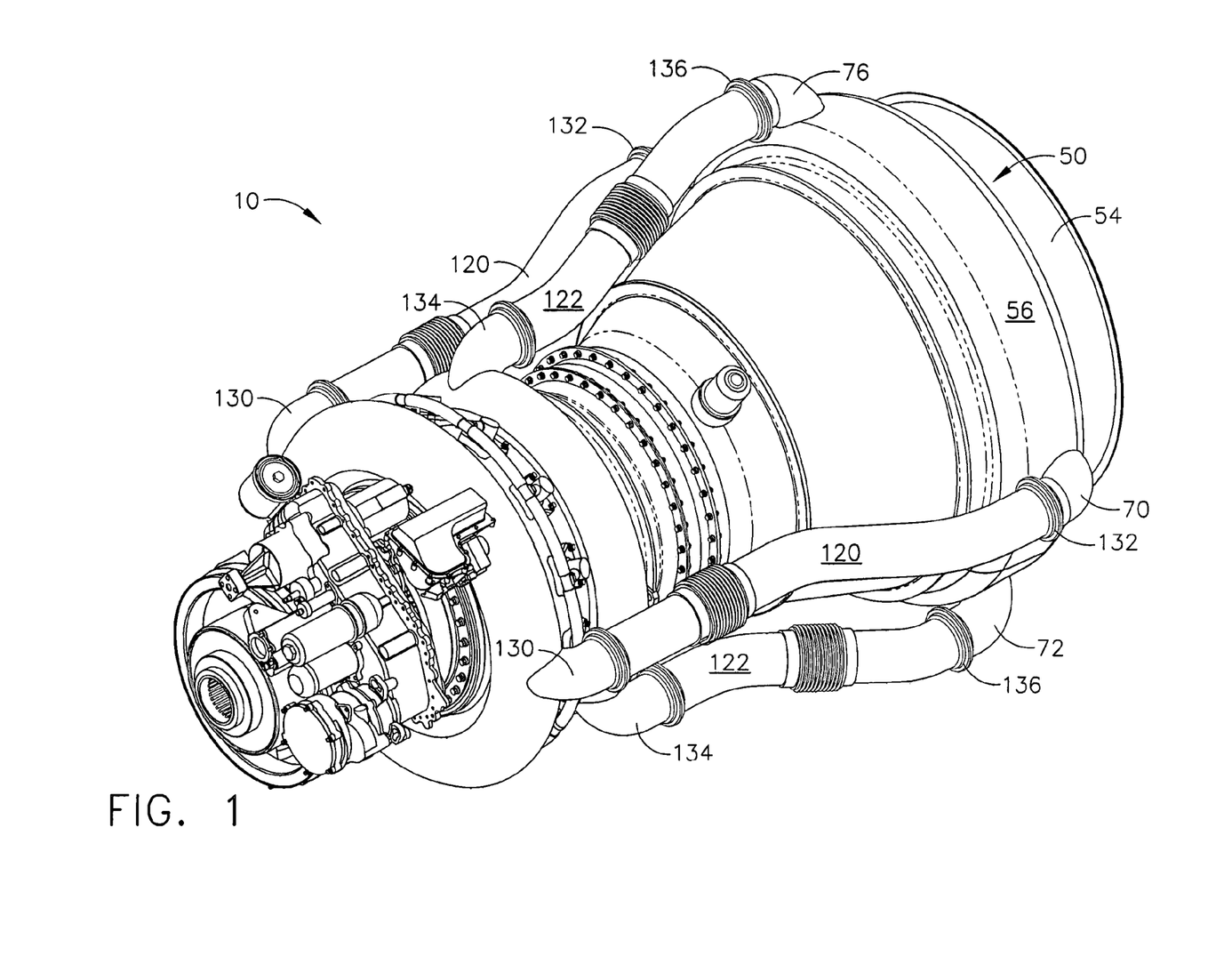
FIG. 1 is a perspective view of an exemplary gas turbine engine 10 including an exemplary heat exchanger assembly 50.
Figure 2:
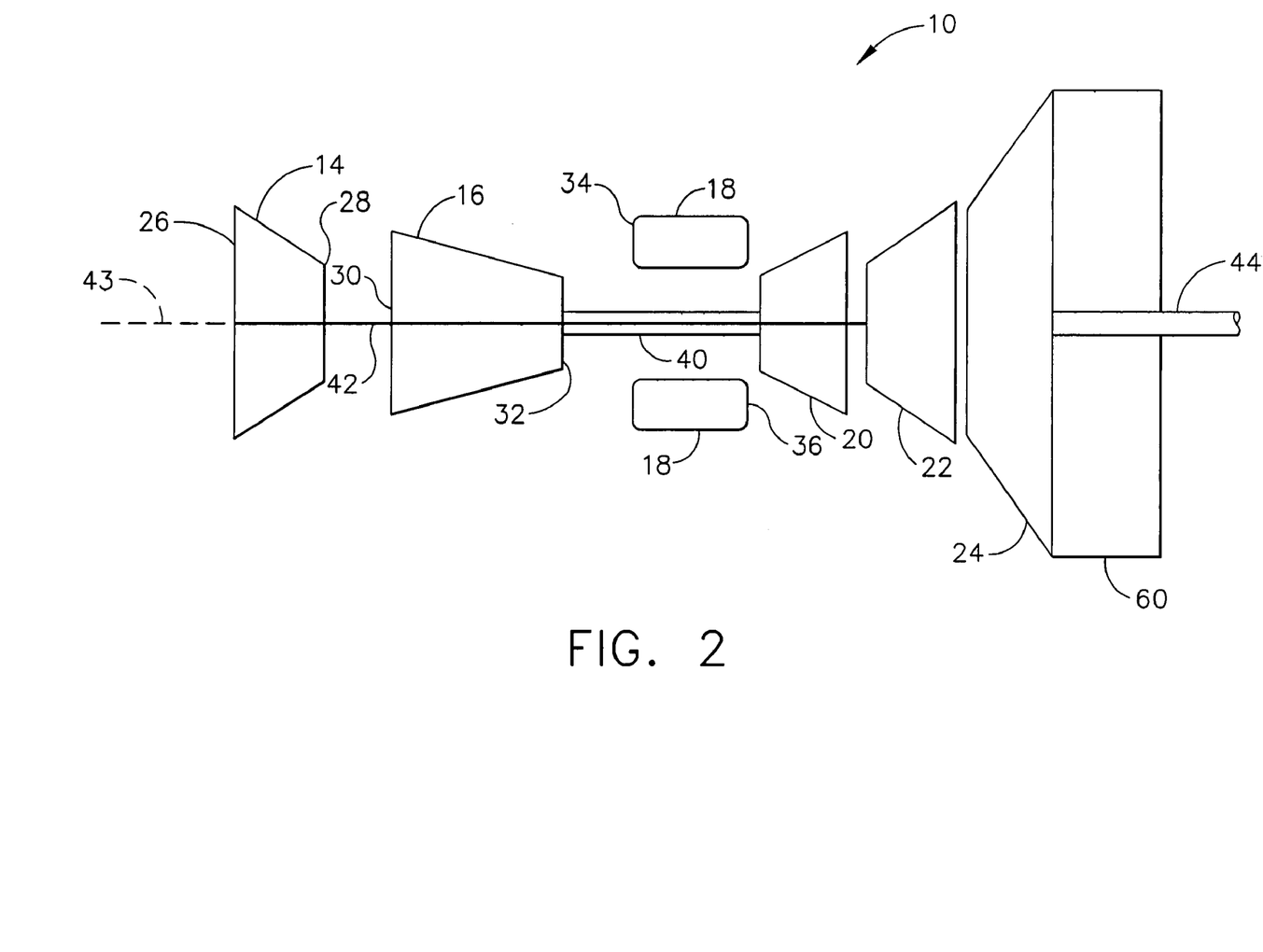
FIG. 2 is a schematic of the gas turbine engine shown in FIG. 1

FIG. 1 is a perspective view of an exemplary gas turbine engine 10 including a heat exchanger assembly 50. FIG. 2 is a block diagram of gas turbine engine 10 (shown in FIG. 1). Gas turbine engine 10 includes, in serial flow relationship, a low pressure compressor or booster 14, a high pressure compressor 16, a combustor 18, a high pressure turbine 20, a low pressure, or intermediate turbine 22, and a power turbine or free turbine 24. Low pressure compressor or booster 14 has an inlet 26 and an outlet 28, and high pressure compressor 16 includes an inlet 30 and an outlet 32. Combustor 18 has an inlet 34 that is substantially coincident with high pressure compressor outlet 32, and an outlet 36. In one embodiment, combustor 18 is an annular combustor. In another embodiment, combustor 18 is a dry low emissions (DLE) combustor.

High pressure turbine 20 is coupled to high pressure compressor 16 with a first rotor shaft 40, and low pressure turbine 22 is coupled to low pressure compressor 14 with a second rotor shaft 42. Rotor shafts 40 and 42 are each substantially coaxially aligned with respect to a longitudinal centerline axis of rotation 43 of engine 10. Engine 10 may be used to drive a load (not shown) which may be coupled to a power turbine shaft 44. Alternatively, the load may be coupled to a forward extension (not shown) of rotor shaft 42.

In operation, ambient air, drawn into low pressure compressor inlet 26, is compressed and channeled downstream to high pressure compressor 16. High pressure compressor 16 further compresses the air and delivers high pressure air to combustor 18 where it is mixed with fuel, and the mixture is ignited to generate high temperature combustion gases. The combustion gases are channeled from combustor 18 to drive turbines 20, 22, and 24.

The power output of engine 10 is at least partially related to operating temperatures of the gas flow at various locations along the gas flow path. More specifically, in the exemplary embodiment, an operating temperature of the gas flow at high-pressure compressor outlet 32, and an operating temperature of the gas flow at combustor outlet 36 are closely monitored during the operation of engine 10. Increasing an operating temperature of the gas flow entering combustor 18 facilitates increasing the specific fuel consumption of engine 10.

Figure 3:
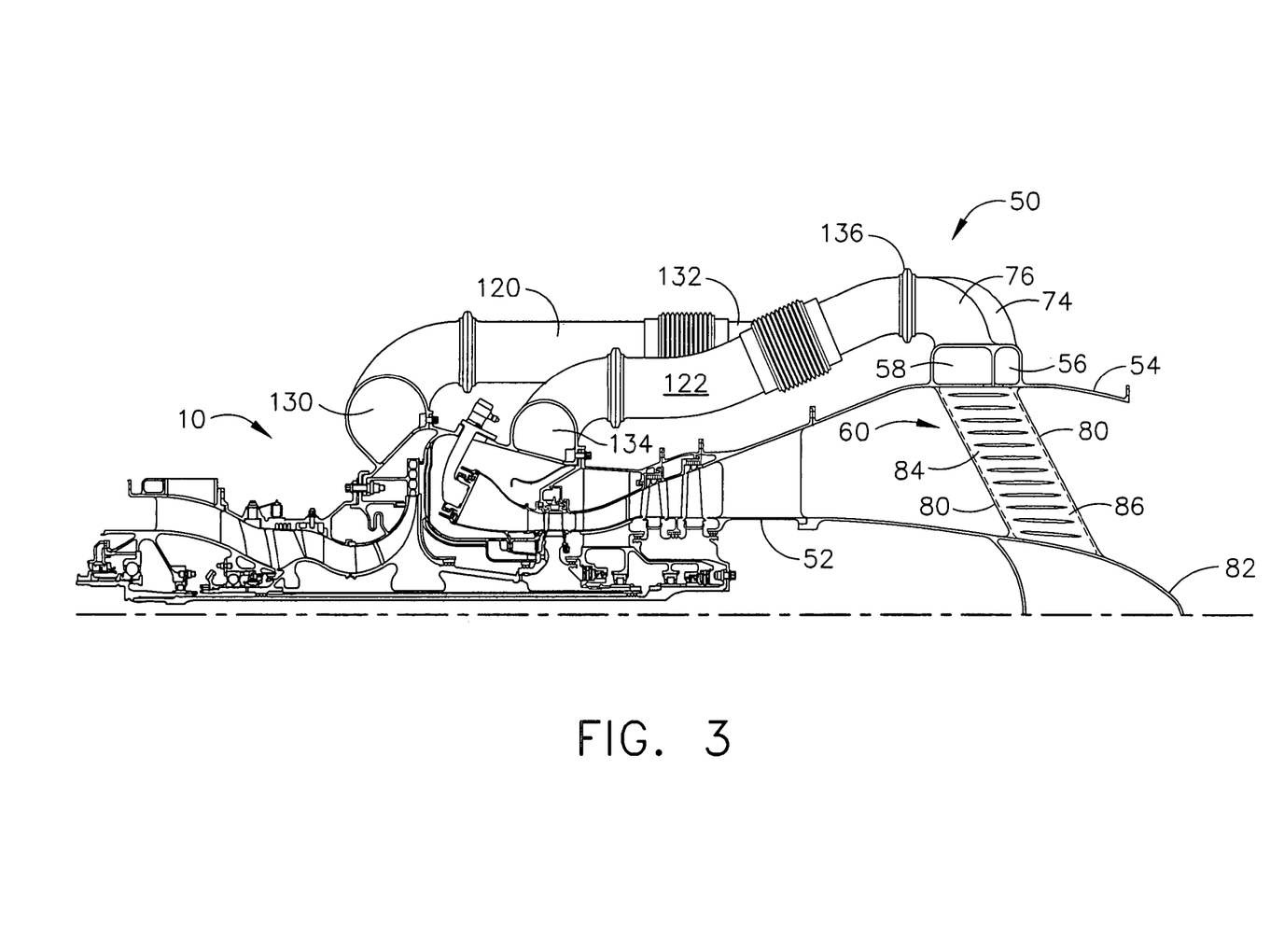
FIG. 3 is a schematic illustration of the gas turbine engine shown in FIG. 1 including the exemplary heat exchanger assembly.
Figure 4:
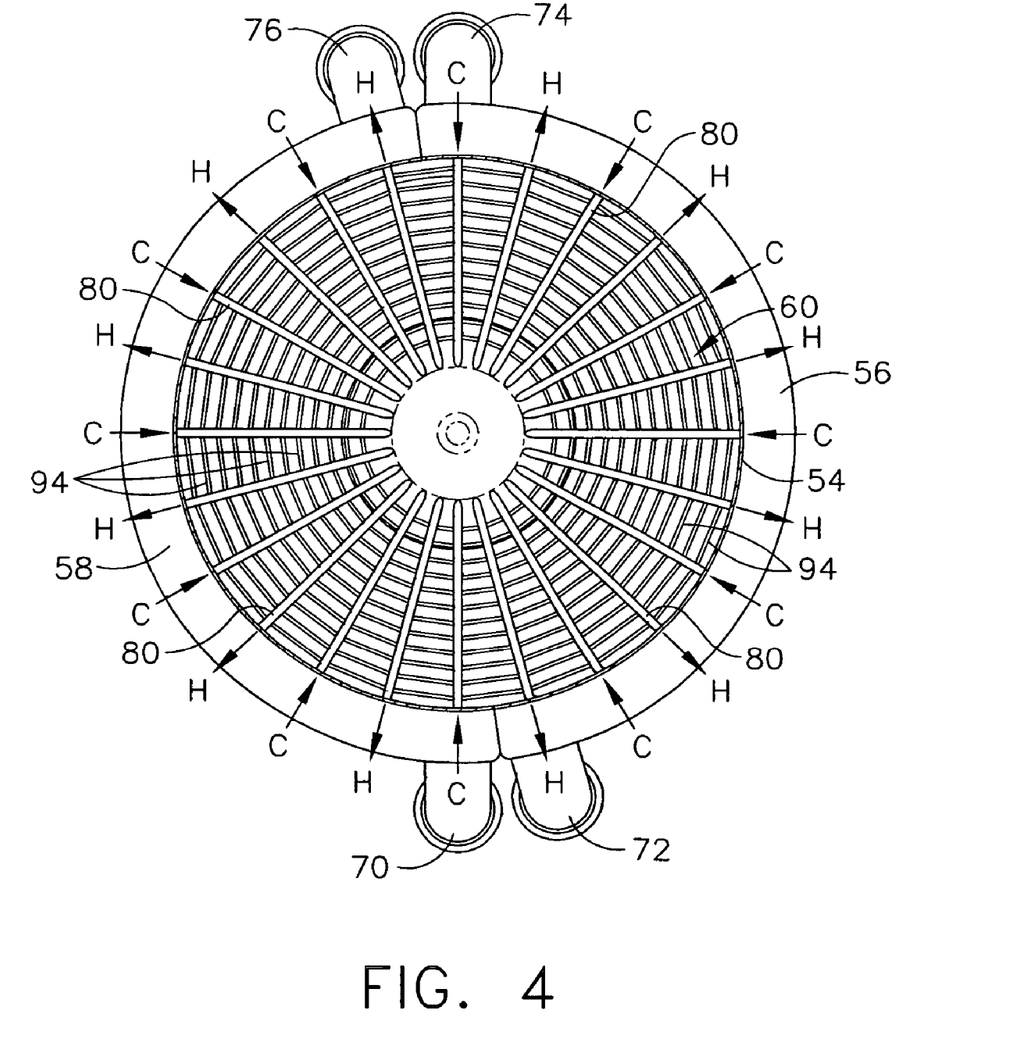
FIG. 4 is an end view of the heat exchanger assembly shown in FIG. 3.
Figure 5:
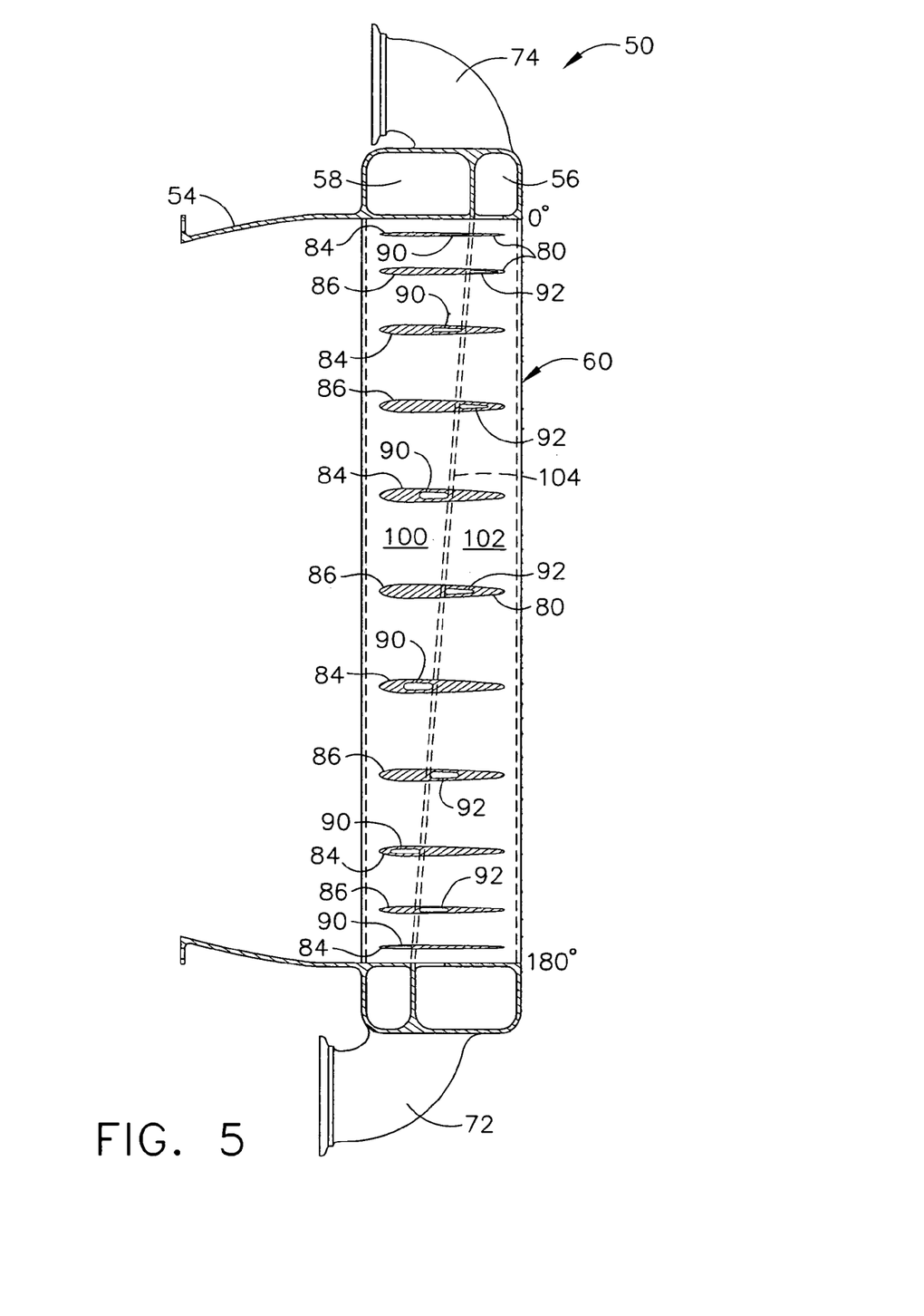
FIG. 5 is a plan view of a first manifold shown in FIGS. 3 and 4.
Figure 6:
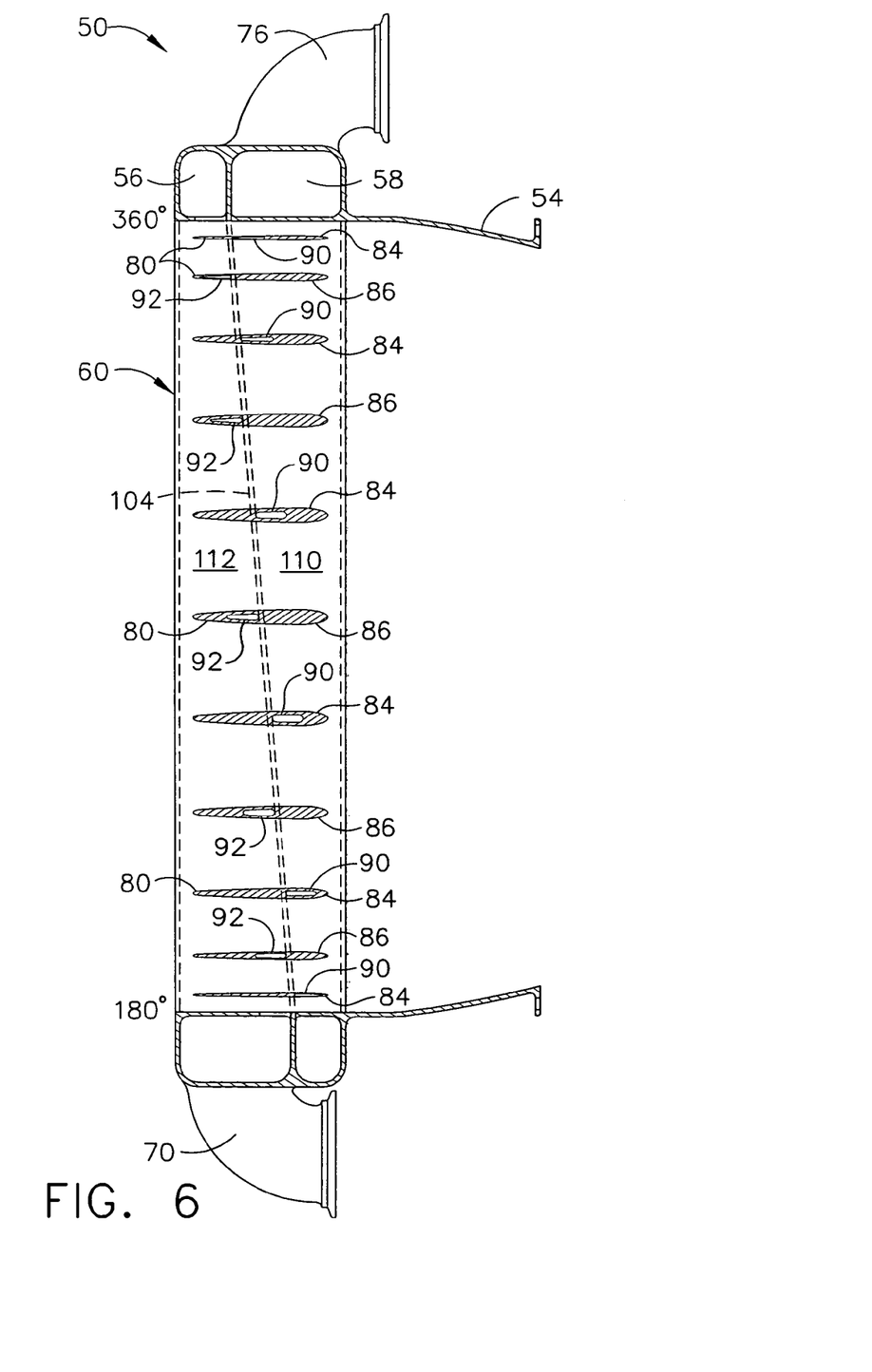
FIG. 6 is a plan view of a second manifold shown in FIGS. 3 and 4.

FIG. 3 is a side view of heat exchanger assembly 50 shown in FIG. 1. FIG. 4 is an end view of heat exchanger assembly 50. FIG. 5 is a plan view of a first manifold. FIG. 6 is a plan view of a second manifold. In the exemplary embodiment, heat exchanger assembly 50 is removably coupled to a gas turbine rear frame 52 of gas turbine engine 10 and includes an outer casing 54, a first manifold 56, a second manifold 58, and a heat exchanger 60 coupled to outer casing 54 and in flow communication with first and second manifolds 56 and 58.

In one embodiment, first manifold 56 and a second manifold 58 are formed unitarily together. In another embodiment, first manifold 56 and a second manifold 58 are fabricated as separate components and are coupled together prior to being coupled to outer casing 54. In another embodiment, first manifold 56 and a second manifold 58 are formed unitarily with outer casing 54.

As described herein, first and second manifolds 56 and 58 extend 360 degrees around an outer surface of outer casing 54. In the exemplary embodiment, first and second manifolds 56 and 58 each extend approximately 180 degrees around an outer surface of outer casing 54. First manifold 56 includes an inlet 70 and an outlet 72, and second manifold 58 includes an inlet 74 and an outlet 76.

Heat exchanger 60 includes a plurality of heat exchangers elements, or struts 80, that extend substantially circumferentially around an engine inside diameter between an outer periphery of a fixed plug nozzle 82 and an inner periphery of each respective manifold 56, 58. More specifically, heat exchanger 60 includes a first quantity of heat exchanger elements 84 and a second quantity of heat exchanger elements 86 that are interleaved with first quantity of heat exchangers elements 84, such that at least one heat exchanger element 84 is positioned between at least two adjacent heat exchanger elements 86.

In the exemplary embodiment, each heat exchanger element 84 includes an opening 90 such that each heat exchanger element 84 is in flow communication with manifold inlets 70 and 74 respectively, and each heat exchanger element 86 includes an opening 92 such that each heat exchanger element 86 is in flow communication with manifold outlets 72 and 76 respectively.

Heat exchanger 60 also includes a plurality of channels 94 that extend between plurality of struts 80. More specifically, and in the exemplary embodiment, plurality of channels 94 extend between a heat exchanger element 84 and at least one adjacent heat exchanger element 86 such that air entering at least one heat exchanger element 84 is channeled through plurality of channels 94 and out at least one adjacent heat exchanger element 86 to facilitate heating the compressor discharge air.

In the exemplary embodiment, first manifold 56 includes a first cross-sectional area 100 and a second cross-sectional area 102 that is inversely proportional to first cross-sectional area 100. More specifically, first manifold 56 is separated by a divider 104 such that heat exchanger elements 84 are coupled in flow communication with manifold inlet 70, and heat exchanger elements 86 are coupled in flow communication with manifold outlet 72.

Second manifold 58 includes a first cross-sectional area 110 and a second cross-sectional area 112 that is inversely proportional to first cross-sectional area 110. More specifically, second manifold 58 is separated by a divider 114 such that heat exchanger elements 84 are coupled in flow communication with manifold inlet 70, and heat exchanger element 86 are coupled in flow communication with manifold outlet 76.

Heat exchanger assembly 50 also includes at least one compressor discharge pipe 120, i.e., a cold pipe, and at least one combustor inlet pipe 122, i.e., a hot pipe. In the exemplary embodiment, heat exchanger assembly 50 includes two compressor discharge pipes 120, i.e., two cold pipes, and two combustor inlet pipes 122, i.e., two hot pipes.

In the exemplary embodiment, heat exchanger 60 is an annular heat exchanger that is positioned within outer casing 54. In another embodiment, heat exchanger 60 is at least one of a radial heat exchanger and/or a cross-flow heat exchanger that is positioned within outer casing 54.

During installation of heat exchanger assembly 50, heat exchanger assembly 50 is coupled to turbine rear frame 52 such that heat exchanger 60 is aligned substantially concentrically with respect to gas turbine engine axis of rotation 43. A sealing apparatus (not shown) is positioned aft of the last stage of compressor 16 to facilitate channeling compressed air to heat exchanger elements 84 via first and second manifold inlets 70 and 74 respectively. More specifically, in the exemplary embodiment, a first end 130 of each respective compressor discharge pipe 120 is coupled in flow communication with compressor 16, and a second end 132 of compressor discharge pipe 120 is coupled to first and second manifold inlets 70 and 74 respectively, such that compressor 16 is coupled in flow communication with manifolds 56 and 58. Additionally, a first end 134 of each respective combustor inlet pipe 122 is coupled to combustor 18, and a second end 134 of combustor inlet pipe 122 is coupled to first and second manifold outlets 72 and 76 respectively, such that combustor 18 is coupled in flow communication with manifolds 56 and 58.

During operation, compressor discharge air from compressor 16 is channeled via compressor discharge pipe 120 to manifolds 56 and 58 respectively. More specifically, compressor discharge air from compressor 16 is channeled via compressor discharge pipes 120 to first and second manifold inlets 70 and 74. The compressor discharge air is then channeled through opening 90 of each respective first quantity of heat exchangers 84, and then through plurality of channels 94 wherein the relatively cool compressor discharge air is placed in heat exchange with the hot exhaust gases of gas turbine engine 10. The heated compressor discharge air is then channeled through second quantity of heat exchangers 86, through opening 92, through first and second manifold outlets 72 and 76, and returned to engine 10, via combustor inlet pipes 122, whereupon the heated compressed air is channeled to combustor section 18.

The above-described heat exchanger assemblies provide a cost-effective and reliable means to facilitate increasing the specific fuel consumption of a gas turbine engine. More specifically, the heat exchanger assembly includes an annular heat exchanger that is coupled against the turbine rear frame. The annular heat exchanger is relatively small compared to known heat exchangers, thus enabling the heat exchanger to be coupled within the gas turbine engine outer casing aft of the gas turbine engine wherein known heat exchangers can not be used because of restricted space limitations.

Figure 7:
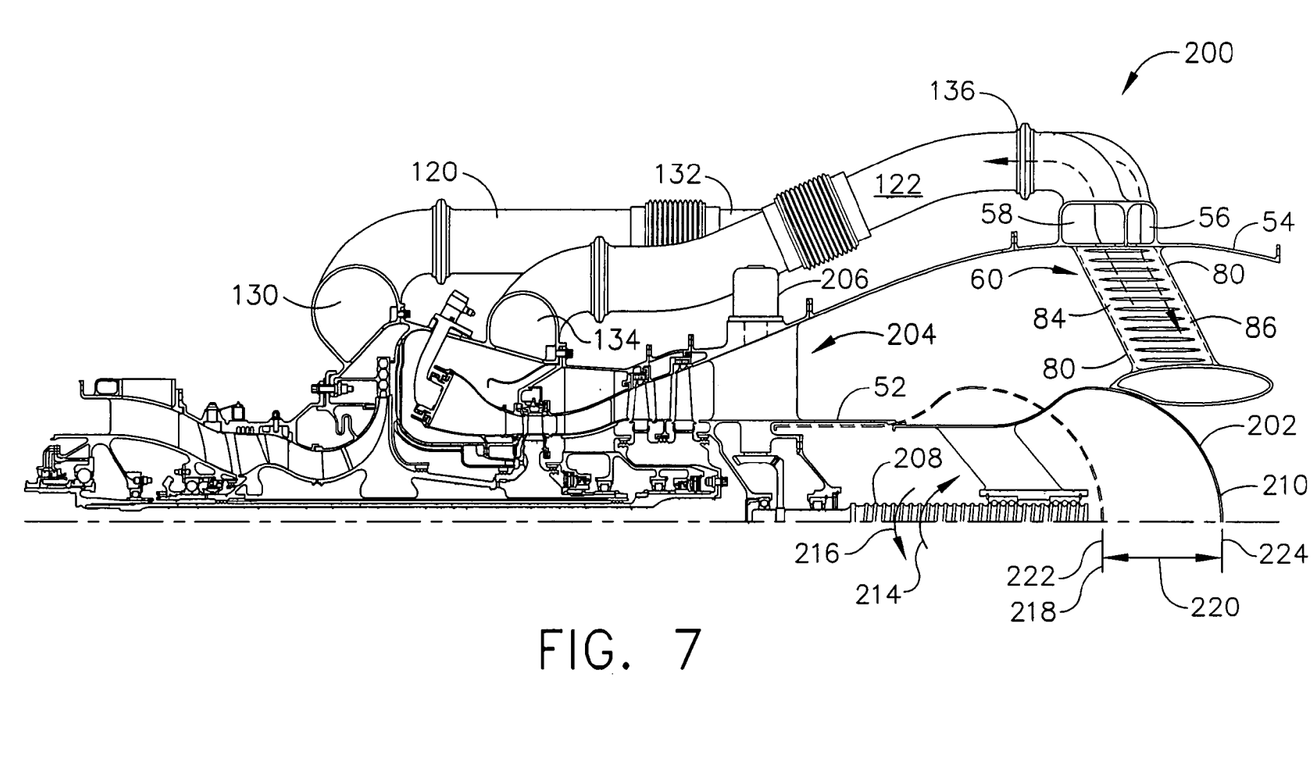
FIG. 7 is a schematic illustration of the gas turbine engine shown in FIG. 1 including an alternative embodiment of a heat exchanger assembly.

FIG. 7 is a side view of an alternative embodiment of a heat exchanger assembly 200 that can be used with gas turbine 10 (shown in FIG. 1). Heat exchanger assembly 200 is substantially similar to heat exchanger assembly 50, (shown in FIGS. 3-6) and components of heat exchanger assembly 200 that are identical to components of heat exchanger assembly 50 are identified in FIG. 7 using the same reference numerals used in FIGS. 3-6.

In the exemplary embodiment, heat exchanger assembly 200 is removably coupled to a gas turbine rear frame 52 of gas turbine engine 10 and includes an outer casing 54, a first manifold 56, a second manifold 58, and a heat exchanger 60 coupled to outer casing 54. In one embodiment, first manifold 56 and second manifold 58 are formed unitarily together. In another embodiment, first manifold 56 and second manifold 58 are fabricated as separate components and are coupled together prior to being coupled to outer casing 54. In another embodiment, first manifold 56 and second manifold 58 are formed unitarily with outer casing 54.

Heat exchanger assembly 200 also includes a variable plug nozzle drive assembly 204 that includes an electric motor drive assembly 206 coupled to a drive apparatus 208. Variable plug nozzle 202 includes a nozzle 210 and a driving portion 212 coupled to nozzle 210. In the exemplary embodiment, drive apparatus 208 is a worm gear and driving portion 212 is slidably coupled to drive apparatus 208 such that when motor assembly 206 is energized, drive apparatus 208 is rotated in either a first direction 214 or a second direction 216. Rotating drive apparatus 208 in either first direction 214 or second direction 216 facilitates transitioning nozzle 202 in either a first axial direction 218 or a second axial direction 220 respectively.

During installation of heat exchanger assembly 200, heat exchanger assembly 200 is coupled to turbine rear frame 52 such that heat exchanger 60 is aligned substantially concentrically with respect to gas turbine engine axis of rotation 43. A sealing apparatus (not shown) is positioned aft of the last stage of compressor 16 to facilitate channeling compressed air to heat exchanger elements 82 via first and second manifold inlets 70 and 74 respectively. More specifically, in the exemplary embodiment, a first end 130 of each respective compressor discharge pipe 120 is coupled in flow communication with compressor 16, and a second end 132 of compressor discharge pipe 120 is coupled to first and second manifold inlets 70 and 74 respectively, such that compressor 16 is coupled in flow communication with manifolds 56 and 58. Additionally, a first end 134 of each respective combustor inlet pipe 122 is coupled to combustor 18, and a second end 134 of combustor inlet pipe 122 is coupled to first and second manifold outlets 72 and 76 respectively, such that combustor 18 is coupled in flow communication with manifolds 56 and 58.

In one embodiment, variable nozzle assembly 202 is transitioned from a first position 222 to a second position 224 by energizing motor drive assembly 204. Energizing motor drive system 204, i.e., motor 206, rotates drive apparatus 208 in a second direction 216. Since, driving portion 212 is coupled to both driving mechanism 208 and nozzle 210, rotating driving mechanism 208 transitions nozzle 210 from a first direction 218 to a second direction 220 thus channeling a substantial portion of compressor discharge air through heat exchanger 60 to facilitate heating the compressor discharge air. Heating a substantial portion of the compressor discharge air, and channeling the heated air to combustor 18, facilitates increasing the specific fuel consumption of gas turbine engine 10.

In another embodiment, energizing motor drive assembly 204 causes variable nozzle assembly 202 to transition from a second position 224 to a first position 222. Energizing motor drive system 204, i.e. motor 206, rotates drive apparatus 208 in a first direction 214. Since, driving portion 212 is coupled to both driving mechanism 208 and nozzle 210, rotating driving mechanism 208 causes nozzle 210 to transition from second direction 220 to first direction 218 thus channeling a substantial portion of the compressor discharge air around heat exchanger 60 and through the engine exhaust when heated combustor air is not desired.

The above-described heat exchanger assemblies provide a cost-effective and reliable means to facilitate increasing the specific fuel consumption of a gas turbine engine. More specifically, the heat exchanger assembly includes an annular heat exchanger that is coupled against the turbine rear frame. The annular heat exchanger is relatively small compared to known heat exchangers, thus enabling the heat exchanger to be coupled within the gas turbine engine outer casing aft of the gas turbine engine. The above-described heat exchanger can thus be used with a plurality of known gas turbine engines in a variety of different applications. For example, the above-described heat exchanger can be coupled to gas turbine engines used with airplanes, helicopters, and various marine applications. Moreover, the above-described heat exchanger can be used in a plurality of applications wherein known heat exchangers can not be used because of restricted space limitations.

The above-described heat exchanger assemblies can be pre-assembled prior to installing the heat exchanger assembly on the gas turbine engine. More specifically, the heat exchanger assembly can be provided as a kit that may be coupled to an existing engine. Thus, to install the heat exchanger assembly, the main components, i.e., the heat exchanger, the inlet and outlet manifolds, the nozzle, and the outer casing are pre-assembled. The main components are then coupled to the turbine rear frame, the compressor outlet pipe is coupled to the inlet manifold and the combustor inlet pipe is coupled to the outlet manifold to complete the installation on any known gas turbine engine.

Exemplary embodiments of a heat exchanger assembly are described above in detail. The heat exchanger assembly components illustrated are not limited to the specific embodiments described herein, but rather, components of each heat exchanger assembly may be utilized independently and separately from other components described herein. For example, the annular heat exchanger described above may also be used in combination with other engine combustion systems.

While the invention has been described in terms of various specific embodiments, those skilled in the art will recognize that the invention can be practiced with modification within the spirit and scope of the claims.

What is claimed is:

1. A method for assembling a gas turbine engine including a compressor and a combustor, said method comprising:
    fabricating a heat exchanger assembly that includes at least one heat exchanger, wherein the heat exchanger includes:
    a first manifold including an inlet and an outlet,
    a first quantity of heat exchanger elements coupled in flow communication with the manifold inlet;
    a second quantity of heat exchanger elements coupled in flow communication with the manifold outlet, each of the first and second quantities of heat exchanger elements are each aligned substantially perpendicular to a direction of exhaust flow discharged from the gas turbine engine therebetween, and
    a plurality of channels coupled in flow communication between the first and second quantity of heat exchanger elements to enable compressor discharge air to be channeled from the first quantity of heat exchanger elements to the second quantity of heat exchanger elements; and
    coupling the inlet of the heat exchanger assembly to the gas turbine engine such that the heat exchanger is positioned substantially concentrically with respect to an axis of rotation of the gas turbine engine, and such that the heat exchanger receives compressor discharge air; and
    coupling the exhaust of the heat exchanger assembly to the combustor such that the compressor discharge air is channeled from the heat exchanger assembly to the combustor.

2. A method in accordance with claim 1 wherein fabricating a heat exchanger assembly further comprises fabricating a heat exchanger that includes:
    a second manifold including an inlet and an outlet,
    a first quantity of heat exchanger elements coupled in flow communication with the second manifold inlet,
    a second quantity of heat exchanger elements coupled in flow communication with the second manifold outlet, and
    a plurality of channels coupled in flow communication between the first and second quantity of second manifold heat exchanger elements enable compressor discharge air to be channeled from the first quantity of heat exchanger elements to the second quantity of heat exchanger elements within the second manifold.

3. A method in accordance with claim 2 wherein fabricating a heat exchanger assembly further comprises fabricating the first and second manifolds as a unitary manifold.

4. A method in accordance with claim 1 wherein coupling the heat exchanger assembly to the gas turbine engine further comprises:
    coupling an annular heat exchanger to an outer casing; and
    coupling the outer casing to a rear frame of the gas turbine engine such that the annular heat exchanger is aligned substantially concentrically with an axis of rotation of the gas turbine engine.

5. A method in accordance with claim 1 wherein coupling the heat exchanger assembly to the gas turbine engine further comprises coupling a heat exchanger assembly including a fixed plug nozzle to a rear frame of the gas turbine such that a predetermined quantity of compressor air is channeled through the at least one heat exchanger assembly.

6. A method in accordance with claim 5 wherein coupling a movable apparatus further comprises coupling at least one of a mechanical device, a hydraulic device, and a pneumatic device to the variable plug nozzle to selectively regulate an amount of compressor air channeled through the heat exchanger.

7. A method in accordance with claim 1 wherein coupling the heat exchanger assembly to the gas turbine engine further comprises coupling a heat exchanger assembly including a variable plug nozzle to the gas turbine engine to selectively control an amount of compressor air channeled through the at least one heat exchanger assembly.

8. A method in accordance with claim 7 further comprising coupling a movable apparatus to the variable plug nozzle to selectively control an amount of compressor air channeled through the at least one heat exchanger assembly.

9. A heat exchanger assembly for a gas turbine engine, said heat exchanger assembly comprising:
    an annular heat exchanger coupled in flow communication to a compressor, said heat exchanger configured to channel compressor discharge air to a combustor, said heat exchanger assembly coupled to said gas turbine engine such that said heat exchanger is substantially concentrically aligned with respect to an axis of rotation of the gas turbine engine, said heat exchanger assembly comprising:
    a first manifold comprising an inlet and an outlet, wherein said manifold inlet comprises a cross-sectional area that is inversely proportional to a manifold outlet cross-sectional area;
    a first quantity of heat exchanger elements coupled in flow communication with said manifold inlet;
    a second quantity of heat exchanger elements coupled in flow communication with said manifold outlet, each of said first quantity and said second quantity of heat exchanger elements are each aligned substantially perpendicular to a direction of exhaust flow discharged from the gas turbine engine therebetween; and
    a plurality of channels coupled in flow communication between said first and second quantity of heat exchanger elements to enable compressor air to be channeled from said first quantity of heat exchanger elements to said second quantity of heat exchanger elements.

10. A beat exchanger assembly in accordance with claim 9 further comprising:

a second manifold comprising an inlet and an outlet, a first quantity of heat exchanger elements coupled in flow communication with said second manifold inlet;

a second quantity of heat exchanger elements coupled in flow communication with said second manifold outlet; and a plurality of channels coupled in flow communication between said first and second quantity of second heat exchanger elements to enable compressor discharge air to be channeled from said first quantity of heat exchanger elements to said second quantity of heat exchanger elements within said second manifold.

11. A heat exchanger assembly in accordance with claim 10 wherein said first and second manifolds are fabricated as a unitary manifold.

12. A heat exchanger assembly in accordance with claim 9 further comprising a plug nozzle fixedly secured to a rear frame of said gas turbine engine to facilitate controlling a predetermined amount of compressor air channeled through said heat exchanger.

13. A heat exchanger assembly in accordance with claim 9 further comprising a variable plug nozzle coupled to a gas turbine rear frame, said plug nozzle moveable with respect to said heat exchanger to selectively regulate an amount of compressor air channeled through said heat exchanger.

14. A heat exchanger assembly in accordance with claim 13 further comprising a movable apparatus coupled to said variable plug nozzle to facilitate regulating the amount of compressor air channeled through said heat exchanger.

15. A heat exchanger assembly in accordance with claim 14 wherein said movable apparatus comprises at least one of a mechanical device, a hydraulic device, and a pneumatic device.

16. A heat exchanger assembly in accordance with claim 15 further comprising a drive mechanism coupled to said movable device, said drive mechanism configured to selectively move said plug nozzle to selectively regulate the amount of compressor air channeled through said heat exchanger.

17. A gas turbine engine comprising:
a compressor;
a combustor downstream from said compressor;
a turbine coupled in flow communication with said combustor; and
a heat exchanger assembly comprising:
an annular heat exchanger coupled in flow communication to a compressor, said heat exchanger configured to channel compressor discharge air to the combustor, said heat exchanger assembly coupled to said gas turbine engine such that said heat exchanger is substantially concentrically aligned with respect to an axis of rotation of the gas turbine engine, said heat exchanger assembly comprising:
a first manifold comprising an inlet and an outlet, wherein said manifold inlet comprises a cross-sectional area that is inversely proportional to a manifold outlet cross-sectional area;
a first quantity of heat exchanger elements coupled in flow communication with said manifold inlet;
a second quantity of heat exchanger elements coupled in flow communication with said manifold outlet, each of said first quantity and said second quantity of heat exchanger elements are each aligned substantially perpendicular to a direction of exhaust flow discharged from said gas turbine engine therebetween; and
a plurality of channels coupled in flow communication between said first and second quantity of heat exchanger elements to enable compressor air to be channeled from said first quantity of heat exchanger elements to said second quantity of heat exchanger elements.

18. A gas turbine engine in accordance with claim 17 wherein said heat exchanger assembly further comprises a plug nozzle fixedly secured to a rear frame of said gas turbine engine to facilitate controlling a predetermined amount of compressor air channeled through said heat exchanger.

19. A gas turbine engine in accordance with claim 17 wherein said heat exchanger assembly further comprises a variable plug nozzle coupled to a rear frame of said gas turbine engine, said variable plug nozzle moveable with respect to said heat exchanger to facilitate regulating an amount of compressor discharge air that is channeled through said heat exchanger.

20. A gas turbine engine in accordance with claim 19 wherein said heat exchanger assembly further comprises:
a translation apparatus coupled to said plug nozzle to facilitate regulating the amount of compressor air channeled through said heat exchanger; and
a drive mechanism coupled to said translation device, said drive mechanism configured to selectively translate said variable plug nozzle to facilitate regulating the amount of compressor air channeled through said heat exchanger.

* * * * *